(12) United States Patent
Lee

(10) Patent No.: US 7,651,241 B2
(45) Date of Patent: Jan. 26, 2010

(54) DIRECT TYPE BACKLIGHT UNIT AND METHOD FOR FORMING DIFFUSER IN THE DIRECT TYPE BACKLIGHT UNIT

(75) Inventor: Hyun-Su Lee, Incheon (KR)

(73) Assignee: LG Display Co., Ltd., Seoul (KR)

( * ) Notice: Subject to any disclaimer, the term of this patent is extended or adjusted under 35 U.S.C. 154(b) by 36 days.

(21) Appl. No.: 11/642,880

(22) Filed: Dec. 21, 2006

(65) Prior Publication Data
US 2008/0002391 A1    Jan. 3, 2008

(30) Foreign Application Priority Data
Jun. 29, 2006   (KR) .................... 10-2006-0059977

(51) Int. Cl.
   *F21V 33/00*    (2006.01)
(52) U.S. Cl. .................. 362/223; 362/217.02; 362/240; 362/241; 362/247
(58) Field of Classification Search ............... 362/627, 362/628, 629, 617, 618, 619, 217, 222, 223, 362/249, 247, 238, 240, 241, 236
See application file for complete search history.

(56) References Cited
U.S. PATENT DOCUMENTS

| | | | | |
|---|---|---|---|---|
| 5,384,658 A | * | 1/1995 | Ohtake et al. | ............... 359/707 |
| 6,425,673 B1 | * | 7/2002 | Suga et al. | .................. 362/613 |
| 2005/0007755 A1 | | 1/2005 | Yu et al. | |
| 2005/0219836 A1 | | 10/2005 | Hung | |
| 2006/0044830 A1 | * | 3/2006 | Inoue et al. | .................. 362/614 |
| 2006/0215386 A1 | | 9/2006 | Hatanaka et al. | |

FOREIGN PATENT DOCUMENTS

| | | |
|---|---|---|
| CN | 1344380 A | 4/2002 |
| EP | 0-156 479 A1 | 10/1985 |
| EP | 1 564 478 A1 | 8/2005 |
| JP | 04166813 | 6/1992 |
| JP | 08202298 | 6/1992 |
| JP | 06301034 | 10/1994 |
| WO | WO 2005/028950 | 3/2005 |
| WO | WO 2005/028950 A1 | 3/2005 |
| WO | WO 2006/018996 | 2/2006 |

* cited by examiner

*Primary Examiner*—Laura Tso
(74) *Attorney, Agent, or Firm*—McKenna Long & Aldridge LLP

(57) ABSTRACT

A direct type backlight unit is disclosed. The direct type backlight unit includes a plurality of lamps arranged in a plane with respect to a display area, a diffusion sheet and a diffuser sequentially arranged above the plurality of lamps, and dot patterns formed on at least one of the diffuser and the diffusion sheet to face the plurality of lamps, wherein the dot patterns disperse light at a center of the plurality of lamps and condense the light in a boundary between the plurality of lamps. Thus, an effect for removing a shape display of the lamps on an LCD panel can be obtained to improve display quality. Also, since the dot patterns are formed by a printing method, no separate prism pattern is required. As a result, the material cost can be reduced and stability in mass production can be obtained.

9 Claims, 4 Drawing Sheets

DIRECT TYPE BACKLIGHT UNIT AND METHOD FOR FORMING DIFFUSER IN THE DIRECT TYPE BACKLIGHT UNIT

This application claims the benefit of Korean Application No. 10-2006-059977, filed on Jun. 29, 2006, which is hereby incorporated by reference for all purposes as if fully set forth herein.

BACKGROUND OF THE INVENTION

1. Field of the Invention

The present invention relates to a backlight unit and a method for fabricating the same. More particularly the present invention relates to a direct type backlight unit and a method for forming a diffuser in the direct type backlight unit, in which a structure of a diffuser or a diffusion sheet is improved to prevent a mura of a lamp from occurring.

2. Discussion of the Related Art

A liquid crystal display (hereinafter, referred to as "LCD") device has been widely used as a flat panel display device. Since such an LCD device is a passive display device that does not emit light by itself, the LCD device is provided with a backlight unit on a rear surface of an LCD panel as a light source to display images. Accordingly, the LCD device is affected by a structure of the backlight unit. The backlight unit is divided into an edge type and a direct type based upon the position of a light source with respect to a display area. The edge type backlight unit requires a light guide plate that changes linear light of a lamp to surface light as the lamp is arranged laterally. The direct type backlight unit does not require a light guide plate because the lamp is arranged below a display area. The direct type backlight unit is widely used for large sized LCD devices because the light efficiency is high, the configuration is simple, and there is no limitation in size of the display area.

As shown in FIG. 1 and FIG. 2, the direct type backlight unit includes a plurality of lamps 13 arranged below a display area, a reflecting plate 11 reflecting light emitted from the lamps 13 toward the display area to prevent light loss from occurring, a diffuser 15 and a diffusion sheet 17 diffusing the light from the top of the lamps 13 to uniformly emit the light, and a prism sheet 19 condensing the light, which is diffused to the contour, on the center to improve luminance at the front of the panel. The diffuser 15, the diffusion sheet 17 and the prism sheet 19 are sequentially arranged above the lamps 13. The prism sheet 19 includes a transparent resin 19a and a plurality of triangular prisms 19b arranged on the transparent resin 19a.

In the direct type backlight unit, because the lamps are arranged on the plane, their shapes are displayed in the LCD panel, whereby the distance between the lamps and the LCD panel is considerable concern. For this reason, problems occur in that there is a limitation in forming a thin sized LCD device and an imbalance of luminance is caused in the panel. In other words, since the lamps 13 are arranged below the display area, light density on the rear surface of the diffuser 15 arranged vertically to the lamps 13 varies from light density on the rear surface of the diffuser arranged between the lamps 13, whereby imbalance of luminance is caused.

Accordingly, to solve the above problems, in the related art direct type backlight unit, the reflecting plate 11 having a triangular prism pattern 11a is used as shown in FIG. 1 and FIG. 2.

The direct type backlight unit is provided with a plurality of a triangular prism patterns 11a formed on the reflecting plate 11. The prism patterns 11a are arranged between the lamps 13 and reflect the light toward the display area to minimize loss of the light. In other words, the prism patterns 11a reduce a dark portion between the lamps 13 to minimize luminance deviation.

However, as described above, to form the prism patterns on the reflecting plate, the reflecting plate that can be processed is required. In other words, the reflecting plate is processed using a separate pressing material to form the prism patterns. In this case, the material cost increases as the reflecting plate is processed, and the backlight unit has an increased weight as the separate pressing material is used. Also, since water variation of the shape display of the lamps on the LCD panel seriously occurs due to peak portions of the prism patterns, stability in mass production is reduced.

SUMMARY OF THE INVENTION

Accordingly, the present invention is directed to a direct type backlight unit and method for forming a diffuser in the direct type backlight unit that substantially obviates one or more of the problems due to limitations and disadvantages of the related art.

An advantage of the present invention is to provide a direct type backlight unit in which a structure of a diffuser or a diffusion sheet is improved to prevent a shape display of a lamp on the LCD panel from occurring.

Another advantage of the present invention is to provide a method for forming a diffuser, in which a structure of a diffuser is improved to prevent a shape display of a lamp from occurring on the LCD panel.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a direct type backlight unit comprising a plurality of lamps arranged in a plane with respect to a display area, a diffusion sheet and a diffuser sequentially arranged above the plurality of lamps, and dot patterns formed on at least one of the diffuser and the diffusion sheet to face the plurality of lamps, wherein the dot patterns disperse light at the center of the lamps and condense the light in a boundary between the lamps.

In another aspect of the present invention, there is provided a method for forming a diffuser arranged above a plurality of lamps, which comprises forming dot patterns on one surface of the diffuser to face the plurality lamps by printing, wherein the dot patterns disperse light at a center of the plurality lamps and condense the light in a boundary between the plurality lamps.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

The most serious problem in a direct type backlight unit is the shape display of a lamp on the LCD panel. Accordingly, to prevent the shape display of the lamp from occurring, in a direct type backlight unit according to the present invention, dot patterns having different sizes are formed in a diffuser or a diffusion sheet in accordance with positions of lamps 33. The dot patterns can be formed by a printing method.

Figure 1:
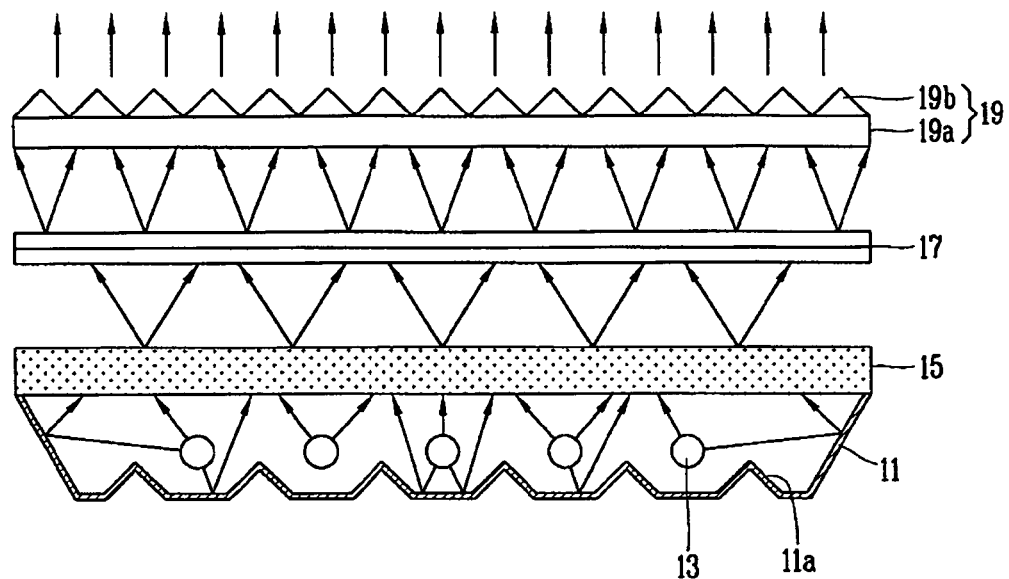
FIG. 1 is a related art direct type backlight unit.
Figure 2:
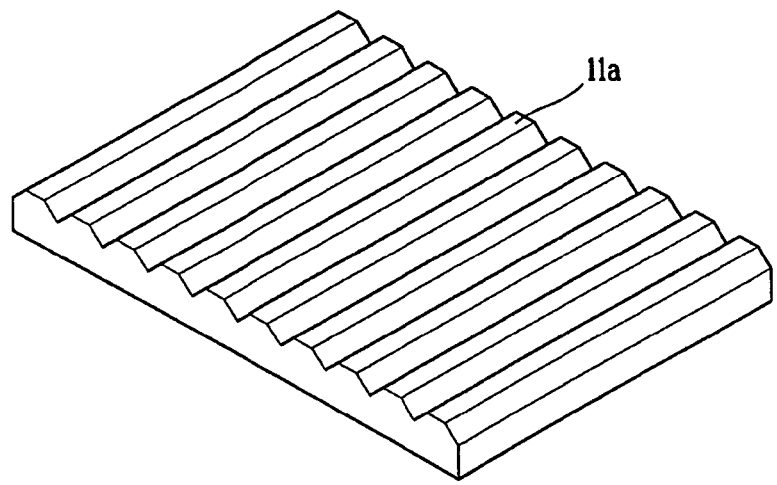
FIG. 2 is a perspective view illustrating a reflecting plate shown in FIG. 1.
Figure 3:
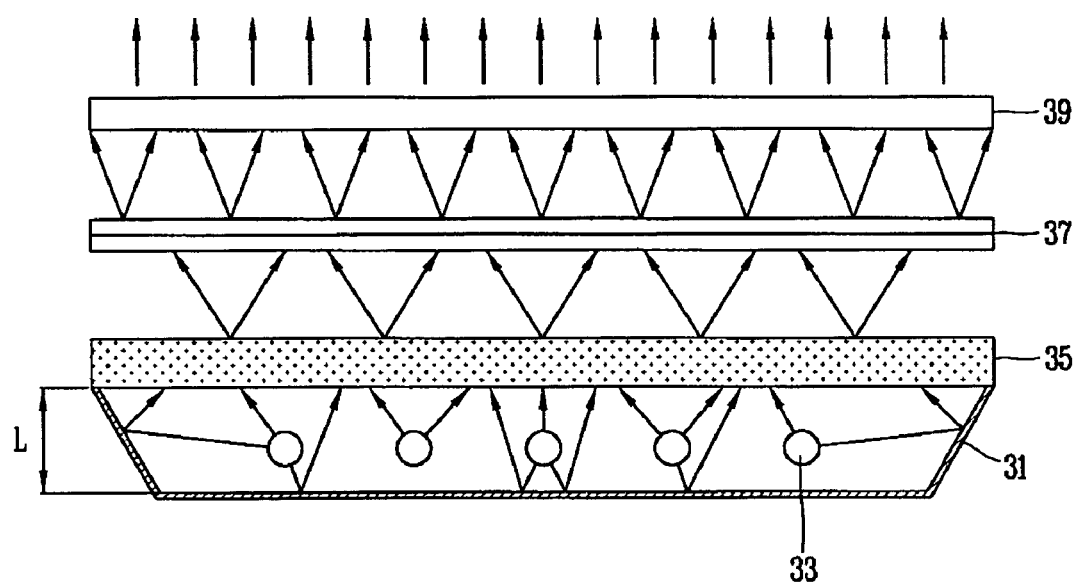
FIG. 3 illustrates a direct type backlight unit according to an embodiment of the present invention.
Figure 4:
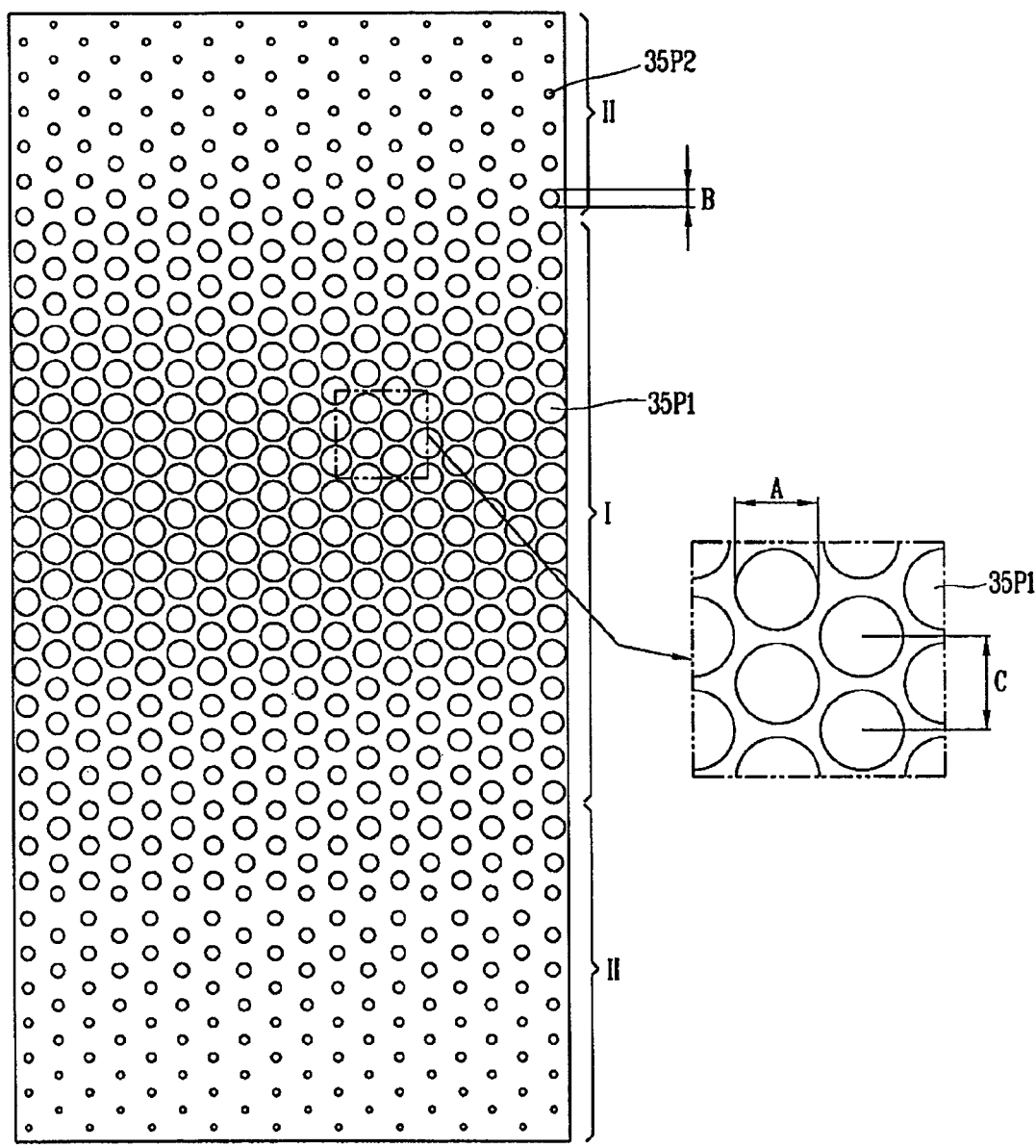
FIG. 4 is a plan view illustrating a diffuser of FIG. 3.

FIG. 3 illustrates a direct type backlight unit according to one embodiment of the present invention, and FIG. 4 is a perspective view illustrating a diffuser of FIG. 3.

As shown in FIG. 3, the direct type backlight unit according to the present invention includes a plurality of lamps 33, a reflecting plate 31, a diffuser 35, a diffusion sheet 37, and a prism sheet 39.

The lamps 33 are arranged below a display area. The reflecting plate 31 reflects light emitted from the lamps 33 toward the display area to prevent loss of the light from occurring. The diffuser 35 and the diffusion sheet 37 are sequentially arranged above the lamps 33, and uniformly diffuse the light from the top of the lamps 33. The prism sheet 39 is arranged above the diffusion sheet 37, and condenses the light, which is diffused to the contour, on the center to improve luminance at the front of an LCD panel. The diffuser 35, the diffusion sheet 37, and the prism sheet 39 are sequentially arranged above the lamps 33.

In the direct type backlight unit according to the present invention, because the lamps are arranged on the plane, their shapes are displayed in the LCD panel, whereby the distance between the lamps and the LCD panel is of considerable concern because it affects uniformity of the light. Specifically, the distance between the reflecting plate and the diffuser may greatly affect uniformity of the light. Accordingly, in the present invention, the distance L between the reflecting plate and the diffuser is limited to about 10 mm or less. The distance L between the reflecting plate and the diffuser is, for example, in the range of about 5 mm$\leq$L$\leq$about 10 mm.

The diffuser 35 is arranged such that dot patterns 35P1 and 35P2 are arranged to face the lamps 33. The dot patterns 35P1 and 35P2 can be patterned such that the pattern size is varied depending on the positions of the lamps 33.

As shown in FIG. 4, the diffuser 35 is arranged to correspond to the center of the lamps 33, and includes a main dot pattern I having first dot patterns 35P1 and a sub dot pattern II having second dot patterns 35P2 whose sizes are relatively small compared to the first dot patterns 35P1. At this time, the main dot pattern I serves to lower transmissivity, while the sub dot pattern II serves to enhance transmissivity. In the main dot pattern I, the size A of the first dot patterns 35P1 may be in the range of about 0.65 mm$\leq$A$\leq$about 0.85 mm, and the distance C between the first dot patterns 35P1 may be in the range of about 0.75 mm$\leq$C$\leq$about 0.85 mm. In the sub dot pattern II, the size B of the second dot patterns 35P2 may be in the range of about 0.15 mm$\leq$B$\leq$about 0.30 mm.

The first dot patterns 35P1 and the second dot patterns 35P2 can be formed on the diffuser 35 by a printing method. The printing method can be used in such a manner that a transparent ink is mixed with a white ink at a proper ratio. In other words, since the transparent ink has a transmissive property transmitting light and the white ink has a reflecting property reflecting light, the intensity of light can be controlled by a proper mixture of the transparent ink and the white ink. The mixture ratio between the transparent ink and the white ink is maintained, for example, in the range of about 2:1 or 3:1.

The first dot patterns 35P1 and the second dot patterns 35P2 may be, for example, substantially circular dots or substantially diamond-shaped dots.

Figure 5:
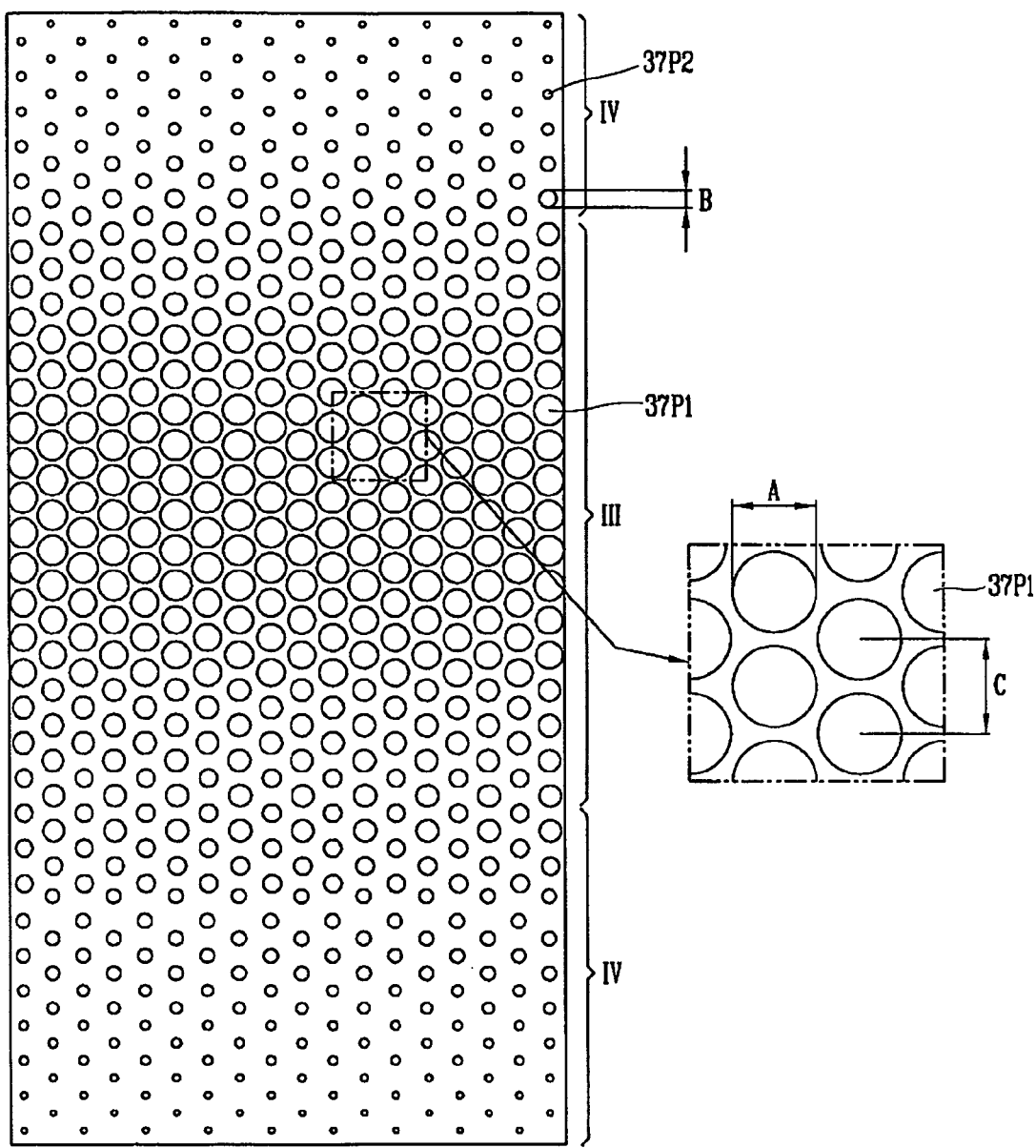
FIG. 5 is a plan view illustrating a diffusion sheet according to another embodiment of the present invention.

FIG. 5 is a perspective view illustrating the diffusion sheet according to another embodiment of the present invention.

The diffusion sheet according to another embodiment of the present invention is the same as that of the first embodiment of the present invention excluding that the diffusion sheet is provided with dot patterns.

As shown in FIG. 5, the diffusion sheet 37 includes a main dot pattern III arranged to face the lamps 33 and a sub dot pattern IV adjacent to the main dot pattern III. The main dot pattern III is arranged to correspond to the center of the lamps 33 and has first dot patterns 37P1. The sub dot pattern IV has second dot patterns 37P2 arranged in a boundary between the lamp 33 and its adjacent lamp, having a relatively small pattern size in comparison to the first dot patterns 37P1. At this time, the main dot pattern III serves to lower transmissivity, while the sub dot pattern IV serves to enhance transmissivity. In the main dot pattern III, the size A' of the first dot patterns 37P1 may be in the range of about 0.65 mm$\leq$A'$\leq$about 0.85 mm, and the distance C' between the first dot patterns 37P1 may be in the range of about 0.75 mm$\leq$about C'$\leq$0.85 mm. In the sub dot pattern IV, the size B' of the second dot patterns 37P2 may be in the range of about 0.15 mm$\leq$B'$\leq$about 0.30 mm.

The first dot patterns 37P1 and the second dot patterns 37P2 may be, for example, substantially circular dots or diamond-shaped dots.

The first dot patterns 37P1 and the second dot patterns 37P2 can be formed on the diffusion sheet 37 by a printing method. The printing method can be used in such a manner that a transparent ink is mixed with a white ink at a proper ratio. In other words, since the transparent ink has a transmissive property transmitting light and the white ink has a reflecting property reflecting light, the intensity of light can be controlled by a proper mixture of the transparent ink and the white ink. The mixture ratio between the transparent ink and the white ink may be, for example, maintained in the range of about 2:1 to 3:1.

The dot patterns may be formed on at least one of the diffuser and the diffusion sheet to face the lamps. However, since the diffusion sheet has high transmissivity, an effect for removing a shape display of the lamps may be reduced more in comparison with the diffuser. Accordingly, if the dot patterns are patterned in the diffuser, a greater effect for removing a shape display of the lamps can be expected.

In accordance with the present invention, the dot patterns are formed on at least one of the diffuser and the diffusion sheet to face the lamps, and serve to disperse the light at the center of the lamps and to condense the light in the boundary between the lamps. Accordingly, the effect for removing a shape display of the lamps can be obtained to improve display quality. Also, since the dot patterns are formed by a printing method, no separate prism pattern is required, unlike the related art. As a result, the material cost can be reduced and stability in mass production can be obtained.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A direct type backlight unit comprising;
   a plurality of lamps arranged in a plane with respect to a display area;
   a diffusion sheet and a diffuser sequentially arranged above the plurality of lamps;
   a main dot pattern portion formed on at least one of the diffuser and the diffusion sheet to face the plurality of lamps, and having first dot patterns dispersing the light by being formed along the long direction at the center of each lamp; and
   a sub dot pattern portion formed on at least one of the diffuser and the diffusion sheet to face the plurality of lamps, and having second dot patterns condensing the light by being formed in the boundary between the lamps, wherein the second dot patterns have a pattern size and pattern distance smaller than a pattern size and pattern distance of the first dot patterns, and wherein the first and second dot patterns are formed by a mixture of a transparent ink having property transmitting light and a white ink having property reflecting light, and the mixture ratio between the transparent ink and the white ink forming the first and second dot patterns is maintained in the range of 2:1 to 3:1.

2. The direct type backlight unit as claimed in claim 1, wherein a distance L between the plurality of lamps and the diffuser is in the range of about $L \leq 10$ mm.

3. The direct type backlight unit as claimed in claim 1, wherein the pattern size A of the first dot patterns is in the range of about $0.65$ mm$\leq A \leq$ about $0.8$ mm.

4. The direct type backlight unit as claimed in claim 1, wherein the pattern size B of the second dot patterns is in the range of about $0.15$ mm$\leq B \leq$ about $0.30$ mm.

5. The direct type backlight unit as claimed in claim 1, wherein the pattern distance C between the first dot patterns is in the range of abut $0.75$ mm $\leq C \leq$ about $0.85$ mm.

6. The direct type backlight unit as claimed in claim 1, wherein the plurality of lamps are fluorescent lamps or LEDs.

7. The direct type backlight unit as claimed in claim 1, wherein the dot patterns are substantially circular shapes or substantially diamond shapes.

8. A method for forming a diffuser arranged above a plurality of lamps, comprising; pg,13
   providing a plurality of lamps;
   arranging a diffuser to face the lamps;
   forming first dot patterns on one surface of the diffuser to face the plurality of lamps by printing, wherein the first dot patterns disperse the light by being formed along the long direction at the center of each lamp; and
   forming second dot patterns on one surface of the diffuser to face the plurality of lamps by printing, wherein the second dot patterns condense the light by being formed in the boundary between the lamps, and have a pattern size and pattern distance that are smaller than a pattern size and pattern distance of the first dot patterns,
   wherein the first and second dot patterns are formed by a mixture of a transparent ink having property transmitting light and a white ink having property reflecting light, and the mixture ratio between the transparent ink and the white ink forming the first and second dot patterns is maintained in the range of 2:1 to 3:1.

9. A direct type backlight unit comprising;
   a plurality of lamps arranged in a plane with respect to a display area;
   a diffusion sheet and a diffuser sequentially arranged above the plurality of lamps, wherein a distance L between the plurality of lamps and the diffuser is in the range of about $L \leq 10$mm;
   a main dot pattern portion formed on at least one of the diffuser and the diffusion sheet to face the plurality of lamps, and having first dot patterns dispersing the light by being formed along the long direction at the center of each lamp; and
   a sub dot pattern portion formed on at least one of the diffuser and the diffusion sheet to face the plurality of lamps, and having second dot patterns condensing the light by being formed in the boundary between the lamps, wherein the second dot patterns have a pattern size and pattern distance smaller than a pattern size and pattern distance of the first dot patterns, and wherein the first and second dot patterns are formed by a mixture of a transparent ink having property transmitting light and a white ink having property reflecting light, and the mixture ratio between the transparent ink and the white ink forming the first and second dot patterns is maintained in the range of 2:1 to 3:1, and wherein the dot patterns are substantially circular shapes or substantially diamond shapes.

* * * * *